United States Patent [19]

Herring et al.

[11] 4,181,367

[45] Jan. 1, 1980

[54] RATIO RELAY EMERGENCY VALVE SYSTEM FOR VEHICLES

[75] Inventors: Clarence R. Herring, La Habra; Taylor F. Mattern, W. Covina; Curtis E. Radcliffe, La Habra, all of Calif.

[73] Assignee: Sealco Air Controls, Inc., City of Industry, Calif.

[21] Appl. No.: 911,836

[22] Filed: Jun. 2, 1978

[51] Int. Cl.² ............................................. B60T 15/02
[52] U.S. Cl. .......................................... 303/7; 303/40
[58] Field of Search ................... 303/6 R, 7, 8, 29, 40, 303/47

[56] References Cited

U.S. PATENT DOCUMENTS

| | | | |
|---|---|---|---|
| 1,995,807 | 3/1935 | Hewitt | 303/40 |
| 2,985,490 | 5/1961 | Gates | 303/40 |
| 3,832,015 | 8/1974 | Beck et al. | 303/40 |
| 4,080,004 | 3/1978 | Ury | 303/40 |

*Primary Examiner*—Duane A. Reger
*Attorney, Agent, or Firm*—John E. Wagner

[57] ABSTRACT

A brake system for a vehicle having two sets of brakes, a front set and a rear set of brakes and including a source of fluid pressure, a driver controlled valve, in which the sets of brakes respond to fluid pressure from said source via said driver controlled valve, including a secondary valve having at an input port a connection to the driver controlled valve and its output port coupled to the rear brakes, and in which the secondary valve means produces an increase in pressure at the output port above the pressure of the input port, in which the secondary valve including time delay means for reducing excess pressure at the outlet port to reduce the pressure at the outlet port to substantially the pressure at the inlet port after the application of pressure to the inlet port by operation of the driver controlled valve.

27 Claims, 17 Drawing Figures

RATIO RELAY EMERGENCY VALVE SYSTEM FOR VEHICLES

BACKGROUND OF THE INVENTION

The need for improved braking systems for tractor trailer combinations has been recognized for a number of years. One end result of this recognized need has been the promulgation of Department of Transportation FMVSS-121 standards, requiring faster acting tractor and trailer brake systems. These standards have received only mixed acceptance in their implementation although the needed principle of brake improvement is well recognized.

Even with systems complying with the 121 standards, there is a common occurrence that 121 standard tractors must tow pre 121 standard trailers. Thus, a faster acting tractor brake systems is coupled to a slower acting less efficient trailer brake sub-system. The net result is a combination with greater tendency to jacknife then heretofore upon hard or panic brake application.

Thus, there exists a need for an improved braking system providing faster acting more effectiving braking for trailers.

Attempts have been made to provide enhanced braking pressure at the trailer in both pre and post 121 systems. This is accomplished by the use of a ratio relay valve which applies an increased pressure to brakes employing a stepped piston having a smaller diameter on the brake side than on the inlet side. A typical fixed rate if 1.5 to 1. No one, however, has provided automatic time variable braking to brake systems.

BRIEF STATEMENT OF THE INVENTION

Given the foregoing state of the art, we have invented a new braking concept and have developed the apparatus to carry out the concept. We further have implemented the invention through structurally slight change in proven apparatus. Thus, the reliability of existing systems is not sacrificed through the conceptual and operational change achieved in employing our invention. The net result is that by the direct substitution of one slightly modified valve, the braking system exhibits not only enhanced braking pressure at the trailer brake cylinder but:

(1) the enhanced pressure automatically drops to tractor braking pressure after a time delay;

(2) the level of enhanced braking pressure at the traiiler varies in magnitude as a direct function of the braking pressure applied to the tractor brake;

(3) the time duration of the enhanced braking pressure at the trailer brakes is a function of the magnitude of braking pressure applied to the tractor brakes;

(4) the transition from enhanced braking pressure to synchronous (equal) pressure is automatically accomplished continuously with no abrupt pressure changes; and (5) for slow normal braking the system is synchronized.

These features are all accomplished in a braking system comprising a source of fluid pressure such as a pneumatic reservoir, a pedal operated service brake valve, a plurality of service brakes lines, a first line serving the first brake set or tractor brakes and a second line serving a second brake set or trailer brakes. The second line supplies braking pressure to the second brake set through an improved ratio relay emergency valve as described herein.

The ratio relay emergency valve of this invention employs a housing defining a stepped cylinder having a larger area (diameter) at the inlet or supply side and a smaller area (diameter) at the outlet or brake side. A piston is reciprocally positioned in the cylinder for movement response to the application of pressure to the larger area surface. The piston carries an actuator which acts to displace a movable seat opening communication of reservoir pressure to the brake lines. The brake pressure is increased above the supply pressure at the input side of the piston.

The piston also defines an internal chamber communicating with the brake (high pressure) side of the piston via a flow restricting orifice. A second orifice communicates between the chamber and a low pressure area of the piston. The second orifice is of sufficient size that when unobstructed it allows pressure equalization without significant delay relying upon the first orifice for time delay of pressure equalization. The second orifice is slightly obstructed when the piston is fully actuated as in a panic stop. Under certain design relationships the second orifice may increase the time for pressure equalization. At intermediate excursions of the piston the second orifice may be partly obstructed and the delay in pressure equalization is a function of the piston excursion, e.g., the braking pressure applied. The maximum enhanced pressure available at the second set of brakes is a function of the piston area ratios. The minimum enhanced pressure is a function on that ratio as reduced by the flow rate through the first orifice.

BRIEF DESCRIPTION OF THE DRAWINGS

This invention may be more clearly understood from the following detailed description and by reference to the drawings in which.

DETAILED DESCRIPTION OF THE INVENTION

Figure 1:
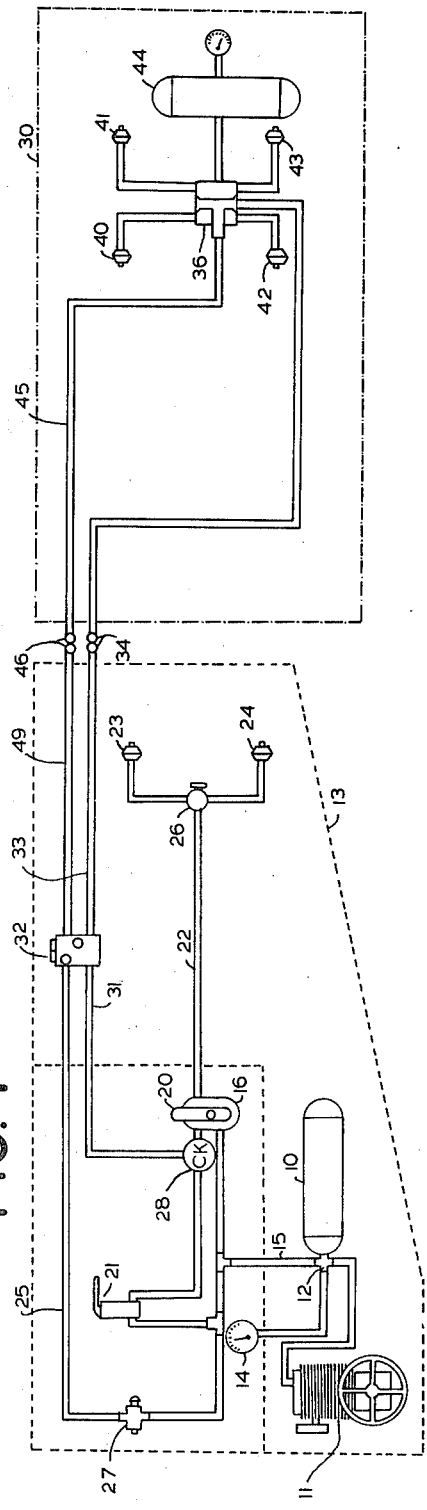
FIG. 1 is a piping diagram for a typical air brake system incorporating this invention.

This invention constitutes a critical element of a brake system for a truck, particularly a tractor-trailer combination employing air actuated brakes. A typical system employing this invention is disclosed in FIG. 1.

Such a typical system comprises an air reservoir 10 which is filled by a compressor 11 driven by the engine. The compressor 11 maintains a predetermined pressure, e.g., 90 to 120 psi in the reservoir supplied through a check valve 12. Reservoir 10, compressor 11 and the elements described below are all located on a tractor denoted by the dashed line 13.

The reservoir 10 has a pressure gauge 14 registering for the driver the pressure available for actuation of the tractor and trailer brakes. The gauge 14 is normally located in the tractor cab.

Reservoir 10 provides braking pressure to line 15 to a foot valve 16 controlled by brake pedal 20. Pedal 20 applies brake pressure to the tractor brakes via line 22, quick release valve 26 and brake chambers 23 and 24. Pedal 20 simultaneously applies brake pressure from reservoir 10 to the trailer via two way check valve 28 and line 31. One additional valve in the cab of the tractor controlling the supply of air from line 15 is a hand valve 21 connected to the trailer brake line 31 via the two-way check valve 28.

A dash control valve 27 for emergency application of brake pressure to the trailer brakes via line 25 also is present in the cab. The simultaneous or synchronous control of braking pressure to the tractor and trailer is accomplished by employing the brake pedal 20. Manual braking of the trailer alone is accomplished employing valve 21 and 27 respectively. Synchronous application of service braking pressure to the trailer denoted by dash-dot lines 30 occurs over line 31 via breakaway valve 32 and line 33, glad hand connector 34 and trailer service line 35 to the ratio relay emergency valve 36 of this invention. Valve 36 supplies braking pressure to each of the brake chambers 40, 41, 42 and 43 which actuate the trailer brakes, unshown. Ratio relay emergency valve 36 applies emergency braking pressure from a trailer reservoir 44 and emergency brake line 45 serving through glad hand connector 46, line 50, breakaway valve 32 and line 25 from dash control 27 in the event of emergency operation of valve 27 or loss of line pressure in lines 25, 45 or 49.

As described above a tractor-trailer system provides for synchronous service and emergency and breakaway brake operation of the tractor and trailer. Attempts have been made in such systems to employ a ratio relay type valve such as valve 36. Ratio relay valves employ a piston having a large diameter at its inlet side than at its outlet side in a stepped diameter cylinder whereby outlet pressure is increased above inlet pressure as a function of the ratio of the piston diameters. Usually this ratio is in the order of 1.5 to 1 to provide a 50% increase in pressure at the trailer brake cylinder (less line losses) as compared with the tractor brakes. This increased pressure is desirable for panic or hard stopping but not desired for normal braking. True synchronous 1:1 braking is usually desired for normal service operation.

Employing this invention all of the advantages of prior ratio relay and emergency valves are obtained with automatic time and pressure variable braking as well.

Figure 3:
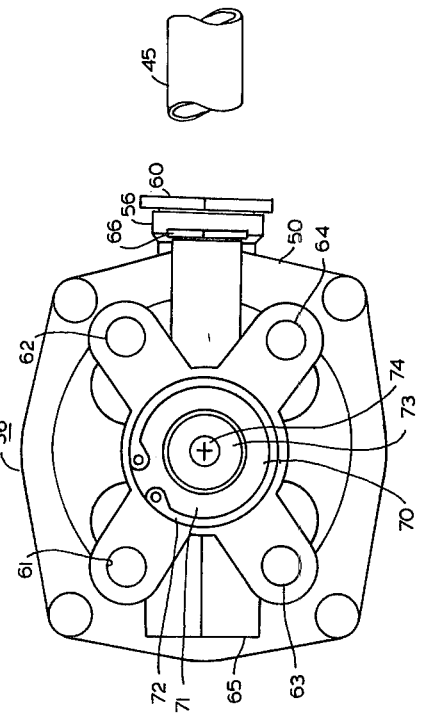
FIG. 3 is a bottom view of the valve of FIG. 2.
Figure 2:
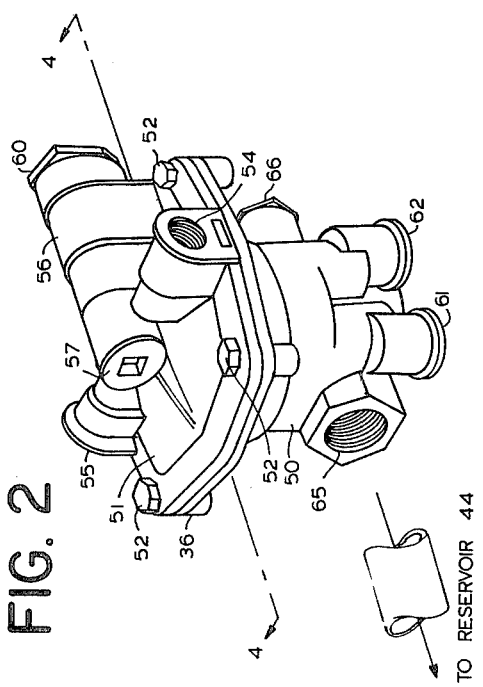
FIG. 2 is an isometric view of the exterior of the improved ratio relay emergency valve of this invention.

Both of these features are obtained basically through the use of our improved ratio relay emergency valve 36 of FIG. 1 shown in FIGS. 2 and 3. As shown in FIGS. 2 and 3, our valve 36 includes a body 50 and a demountable cover 51 secured together by a number of fasteners 52 three of which appear in FIG. 2. The cover 51 includes a pair of service pressure inlet ports 54 and 55 on opposite sides of the cover 51 top surface. The cover 51 also defines a spool valve cylinder 56 employed when the system is in the EMERGENCY mode as described below. The cylinder 56 is sealed at one end by a plug 57 and includes an end cap 60 having a port (unshown in FIG. 2) communicating with the emergency line 45 of FIG. 1 at the end opposite plug 57.

Figure 16:
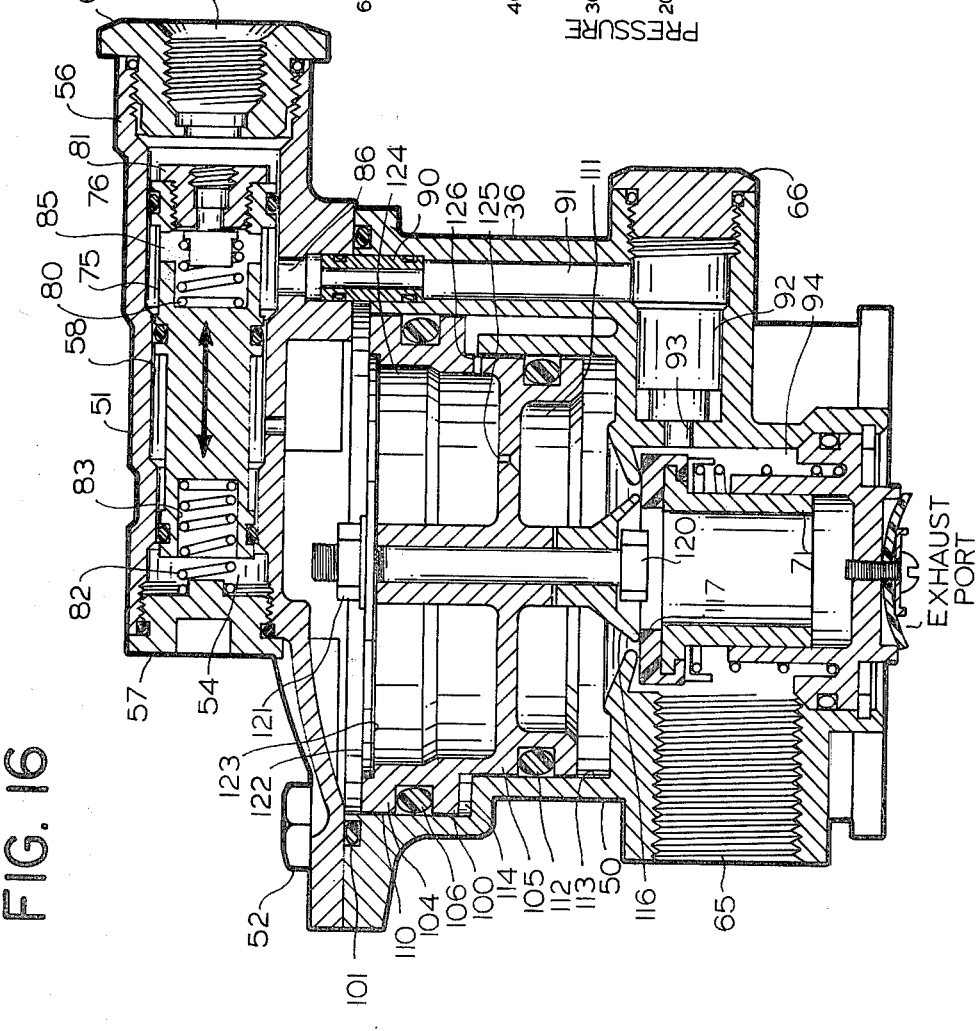
FIG. 16 is a vertical section through the valve of FIGS. 2 and 3 taken along lines 4—4 of FIG. 2.

The body 50 forms an internal cylinder 58 in the central body portion best seen in FIG. 16 and a plurality, e.g., 4 of service supply ports 61-64 best seen in FIG. 3. The body 50 also defines inlet port 65 from reservoir 44 and a normally blocked port 66.

The underside of valve 36 as shown in FIG. 3 shows a flexible exhaust seal 70 forming a part of the exhaust valve assembly 71 which is secured in the valve body 50 by a fastener such as a circle clip 72. The flexible exhaust seal 70 is the actual closure of the exhaust assembly valve and is held in place by curved washer stop 73 and fastener 74. Exhaust valve assembly 71 is exposed to the atmosphere.

Figure 4:
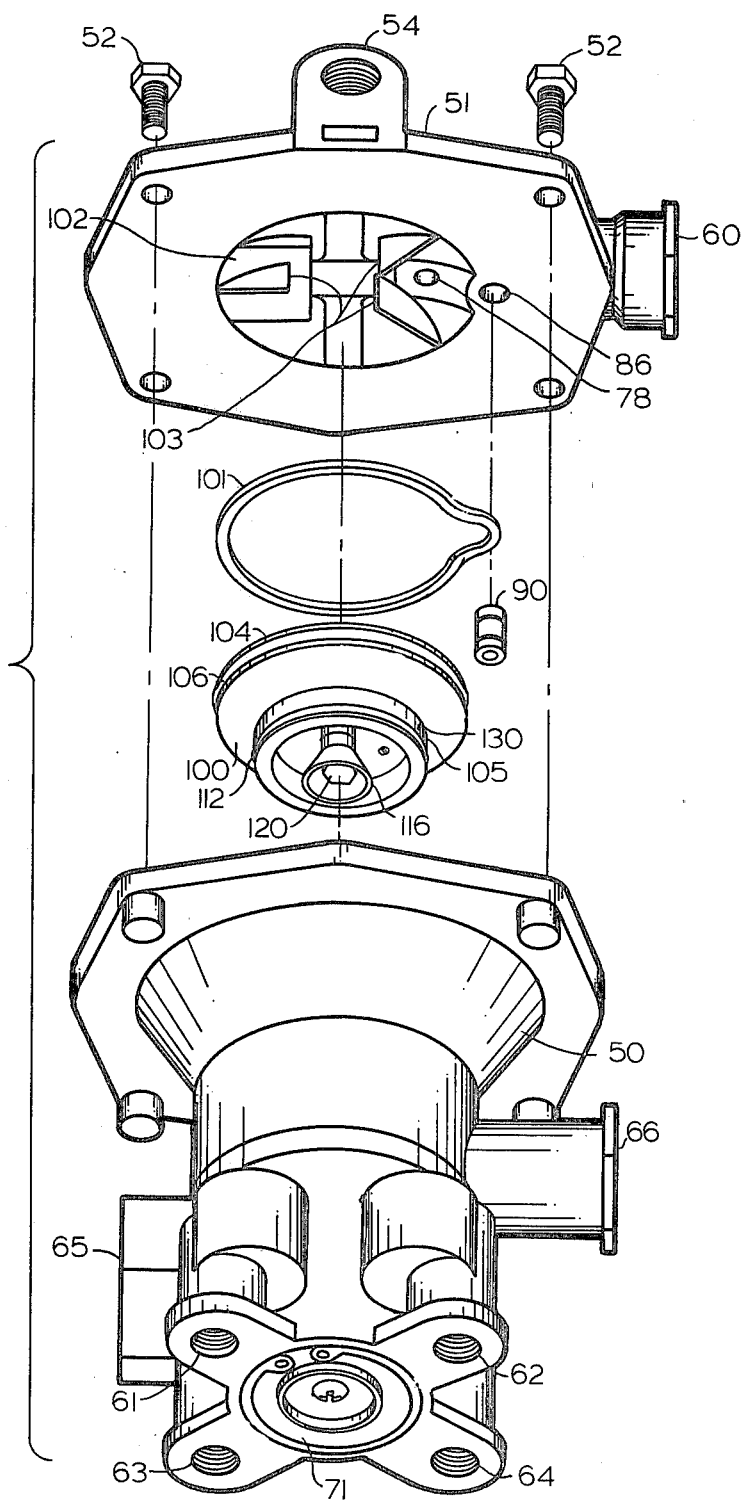
FIG. 4 is an exploded view of the valve of FIGS. 2 and 3.
Figure 5:
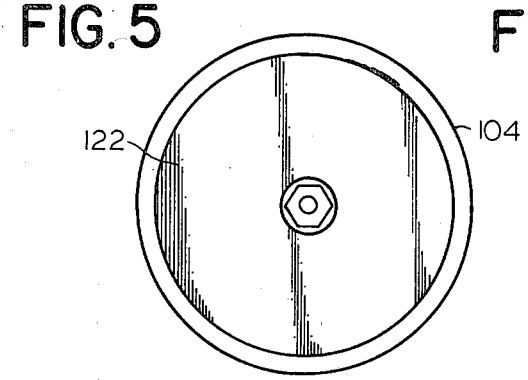
FIGS. 5 through 7 are respective top, bottom and side elevational views of the piston of FIG. 4.
Figure 6:
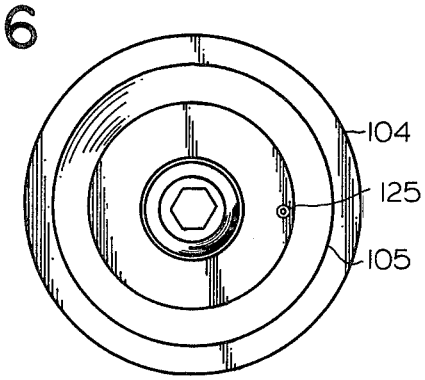
Figure 7:
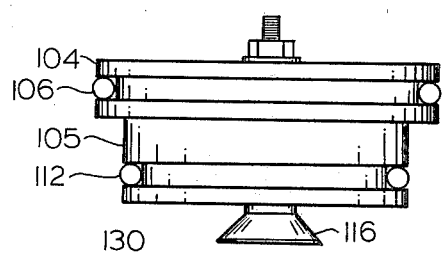

Now refer to FIG. 4 in conjunction with FIGS. 13-16. The valve 36 appears in FIG. 4 with the cover 51 removed from body 50 exposing a domed cavity 102 with a plurality of stops 103 integrally formed with the cover 51. The cavity 102 communicates with ports 54 and 55, the former of which appears in FIG. 4. Appearing between the body 50 and cover 51 are a stepped piston 100 and a gasket 101, the latter of which seals the body 50 and cover 51 when they are assembled. The gasket 101 rests in a groove in body 50 appearing in FIGS. 14 and 16.

Figure 8:
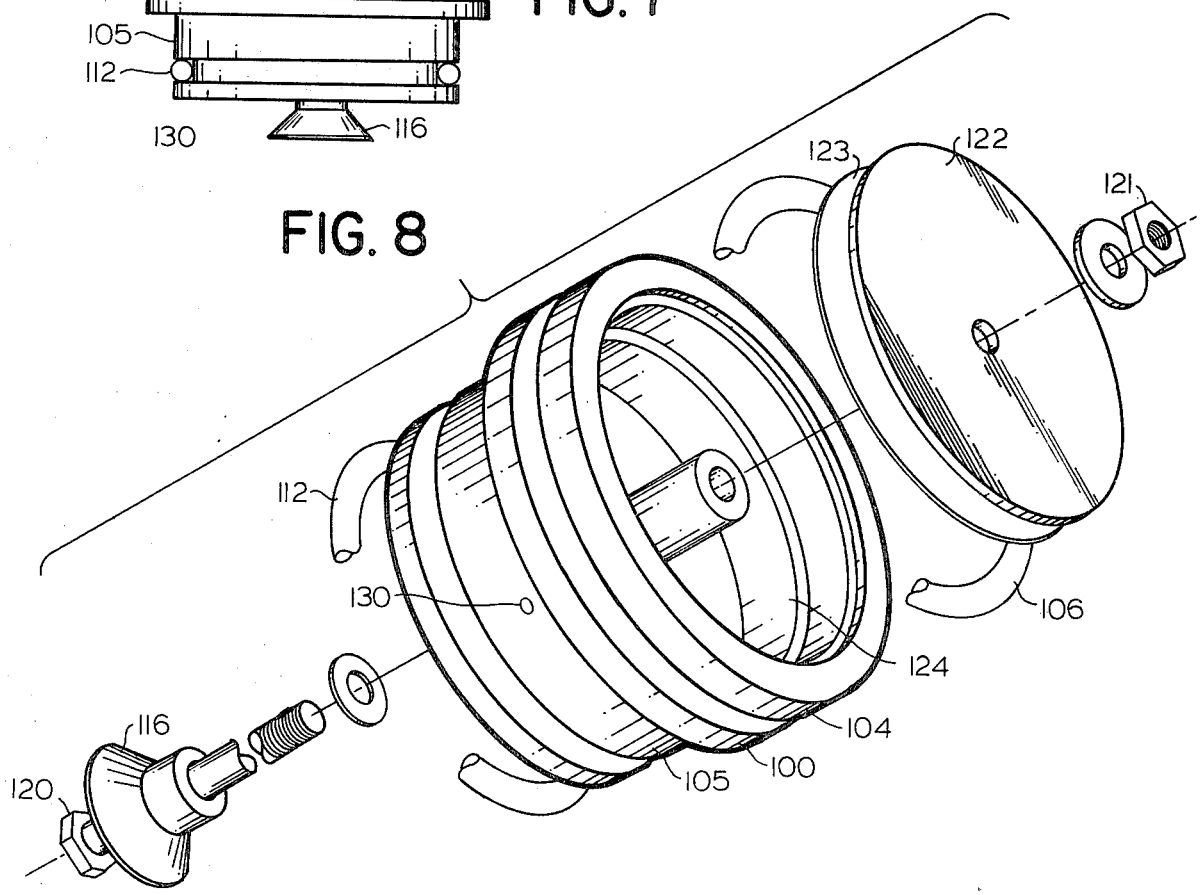
FIG. 8 is an exploded view of the piston of FIGS. 5 through 7.

The piston 100 of FIG. 4 and better seen in exploded view in FIG. 8 and in sectional view in FIG. 16, is stepped, having a larger diameter section 104 and a smaller diameter section 105. A seal 106, e.g., an "O" ring, seals the larger diameter section 104 of piston 100 to the side wall section 110 of cylinder 111 of FIG. 16. A similar seal 112, an "O" ring of smaller diameter seals the smaller diameter section 105 of piston 100 to matching smaller cylinder section 113. Confined between the two cylinder sections 110 and 113 by seals 106 and 112 is a volume or space 114 appearing in FIG. 16 which is largest when piston 100 is at its uppermost or unactuated position.

Piston 100 carries at its lower extremity a flared ring or actuator 116 which opens exhaust valve assembly 71 by depressing its movable seat 117 against the resistance of a return spring forming a part of exhaust valve assembly 71. Actuator 116 is secured to piston 100 by bolt 120 which extends axially through a central bore in piston 100. Bolt 120 and its mating nut 121 also secures a piston cover 122 and seal 123 closing a chamber 124 best seen in FIG. 8.

Figure 15:
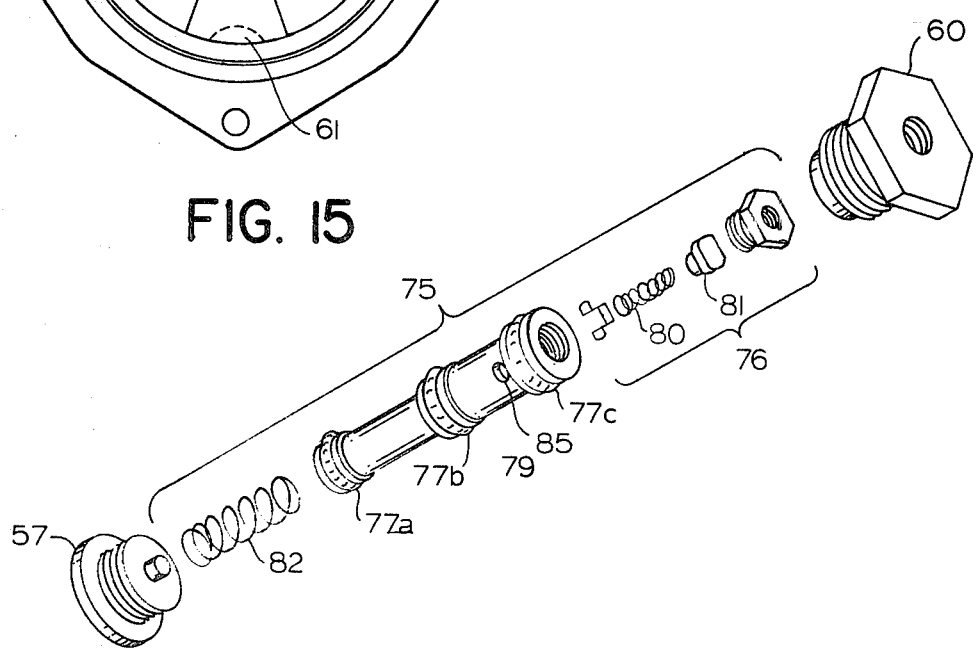
FIG. 15 is an exploded view of the spool valve assembly of this invention.

Now referring again to FIG. 16 and showing the valve 36 in vertical section, the cover 51 defines a stepped chamber 58 within cylinder 56 in which spool valve assembly 75 is mounted for reciprocal movement as indicated by the double ended arrow. The spool valve assembly 75, shown exploded in FIG. 15, includes an internal check valve 76 with its return spring 80 and seat 81. The entire spool valve assembly includes a damper spring 82 having one end in a recess 83 and the opposite end held by end cap 57 which closes one end of the cylinder 56. FIG. 15 shows clearly the three "O" ring seals 77A, B and C of the assembly 75.

The spool valve assembly 75 as shown in FIG. 15 communicates with the emergency inlet port in end cap 60 via the check valve 76 and includes ports 85 in the sidewall in the region of the check valve 76. The ports 85, when assembled and installed in the valve assembly, communicate with a bore 86, connector 90 and bores 91 and 92 in body 50, the last elements of which appear only in FIG. 16. The bore 92 in turn communicates via a port 93 with a chamber 94 surrounding exhaust valve assembly 71. Chamber 94 communicates with reservoir 44 of FIG. 1 via port 65.

BASIC OPERATION

The valve and system of this invention in its normal operation is best described by reference to FIGS. 9—12 which are simplified sectional views showing the air path and position of operating elements during each of the modes of operation. There are four different operational situations for the system which are:

I. ACCEPTING AIR
II. NORMAL BRAKE APPLICATION
III. EXHAUST
IV. EMERGENCY BRAKING.

I. ACCEPTING AIR

Figure 9:
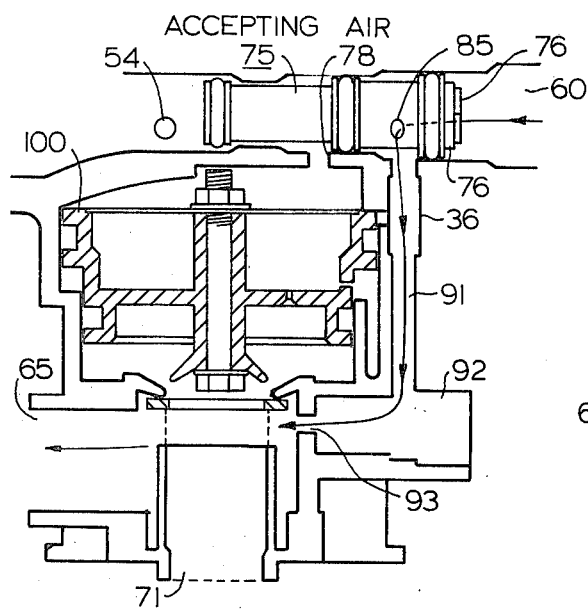
FIGS. 9 through 12 are simplified partial side elevational views of the valve of FIG. 2 showing the piston and spool valve in various operated positions.

Now referring to FIG. 9, the valve 36 is shown with the reservoir 44 of FIG. 1 without air and the system ready to be charged. Air from line 45 of FIG. 1 enters port 60 and passes through the internal check valve 76 in the spool 75. It exits from the spool 75 via the port 85, travels down through the bore 91 to bore 92 to port 93, around the exhaust valve assembly 71 of FIG. 15 but omitted from drawing, FIG. 9 exiting via port 65 to the reservoir 44 of FIG. 1. Air will continue through this route until the tank pressure equals the inlet pressure at port 60. Normally this will be in the order of 120 psi. The system is next ready for normal operation.

II. NORMAL BRAKE APPLICATION

Whenever the foot valve 16 of FIG. 1 or the hand valve 21 of FIG. 1 are operated, service air enters through service inlet port 54, past the "O" ring 77A, around the body of the spool valve 75, through port 78 and above the piston 100. Piston 100 moves downwardly responsive to pressure at a rate and distance related to the great pressure applied to the inlet port 54. The actuator 116 lifts the movable seat 117 from the fixed seat 118 allowing air from the reservoir 44 of FIG. 1 to return via port 65 and out through service port 63 to the brake cylinder. Air, at the underside of the piston 100, passes through orifice 125 into the chamber 124 and out through orifice 126 to the rear face of "O" ring or seal 106. Upon brake application, the pressure at the underside of piston 100, e.g., pressure at the service brake ports 61 through 64, is a function of the application pressure applied to the upper face of piston 100 as increased by the diameter ratio of the larger to the smaller piston areas. The "transfer" of braking pressure from the underside of piston 100 to the underside of seal 106, classified above, results in a temporary pressure unbalance across the seal 106 with the greater pressure on the underside. This produces an upward movement of the piston 100 until the exhaust valve 71 is opened and excess brake pressure is exhausted, and the piston returned downward closing the exhaust valve 71. Then 1:1 or synchronized braking exists. Thus the pressure applied to the service brake chambers is a function of the application pressure applied to inlet port 54 of the control of the operator. The amount and duration of the increase in braking pressure applied to the service chambers is a function of the pressure at inlet 54 and the ratio of diameters of piston 100 and the equalizing flow to orifice 125, chamber 124 and orifice 126.

III. EXHAUST, FIG. 11

After brake application and the operator removes his foot from the brake pedal 20 of FIG. 1 or returns a handle of hand-brake 21 to its un-operated position, application pressure is removed from the top side of piston 100, the piston 100 returns to its uppermost position under the influence of the pressure at its underside and the movable seat 117 returns to engagement with the fixed seal 118. The path is then opened from the service ports 61 to 64 to the exhaust valve assembly 71 and service brake chambers pressure is exhausted through ports 63 and 64 exhaust valve 71 located as indicated by the dashed line in FIG. 11 but omitted for clarity.

IV. EMERGENCY BRAKING, FIG. 12

Figure 10:
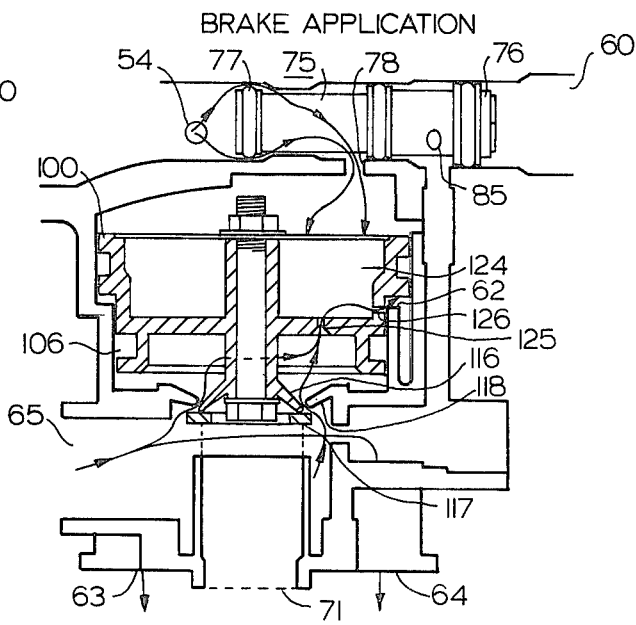
Figure 11:
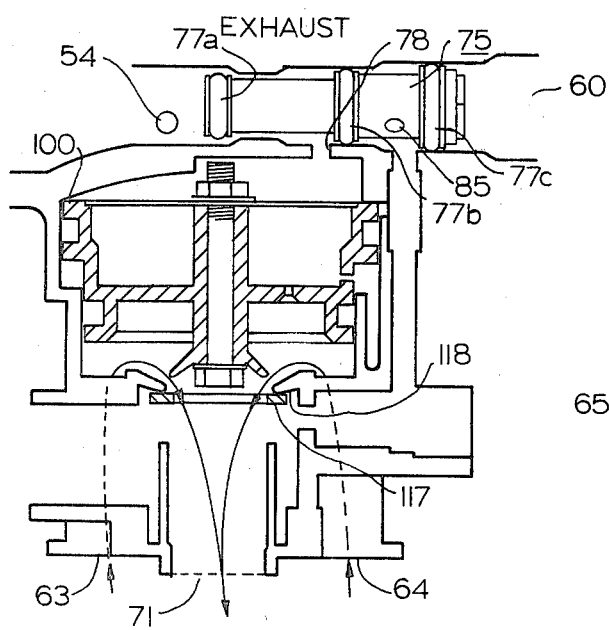
Figure 12:
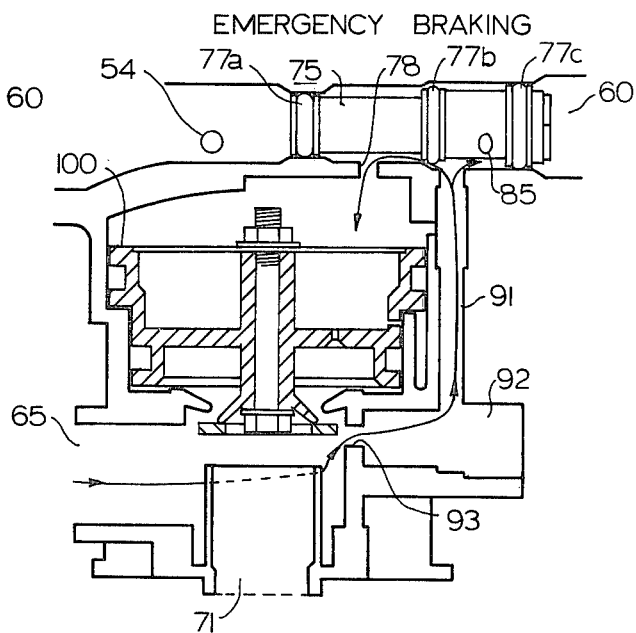
Figure 13:
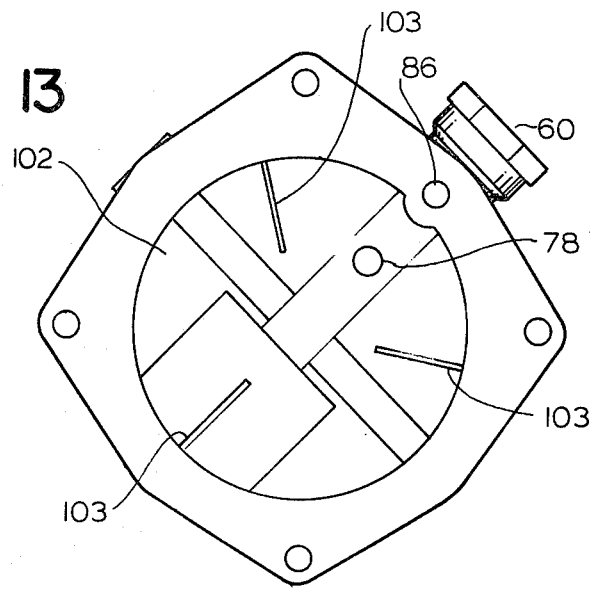
FIG. 13 is a bottom plan view of the cover of the valve of FIG. 2.
Figure 14:
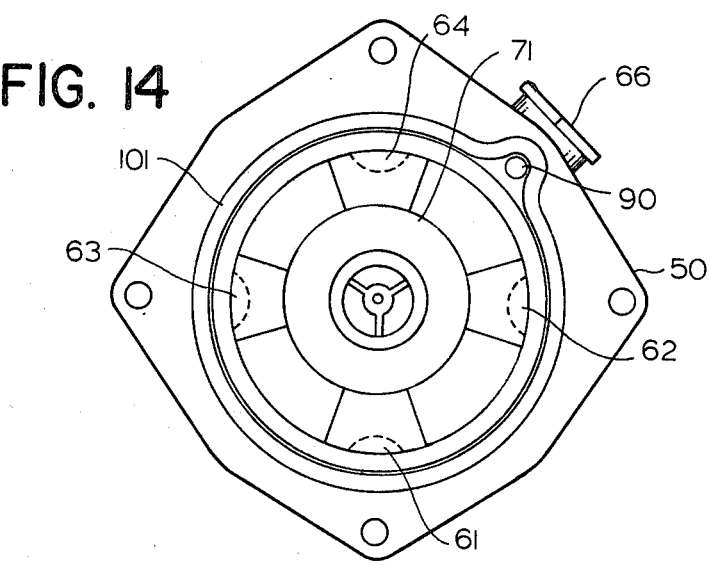
FIG. 14 is a top plan view of the body of the valve of FIG. 2.

If pressure on line 45 of FIG. 1 is lost for any reason as represented in FIG. 12 as a loss of pressure at port 60, the pressure from reservoir 44 of FIG. 1 as applied from port 65 around the exhaust valve assembly indicated by a dashed line 71, through port 93, passages 92 and 91, and applied to the rear side of "O" ring 77C drives the spool 75 to the right, lifting "O" ring 77B from its seat and allowing reservoir pressure to be applied around spool 75 via port 78 to the upper face of piston 100 thereby applying full reservoir pressure to the service brakes in a similar manner as when brake application occurs as shown in FIG. 10 above. Reservoir 44 pressure for emergency braking is supplied to the service brake cylinders and is not relieved until spool 75 is returned to its position to the left in FIG. 9 by the application of pressure to port 60 of at least the emergency reservoir 44 pressure. "O" ring 77A prevents loss of reservoir pressure by its engagement with the wall of cylinder 58. Throughout emergency operation, the check valve 76 has prevented the return or the loss of pressure from reservoir 44 to port 60.

As described heretofore, valve 36 is a conventional ratio relay emergency valve with the force applied to the upper side of the piston above seal 106 transferred to the piston below seal 112, with an increase in unit pressure as a function of the area ratios sealed by "O" rings 106 and 112 as follows:

$$P\text{ out}/P\text{ in} = A_{106}/A_{112} \cong 1.5$$

where
"P in" equals the pressure above piston 100
"P out" equals the pressure below piston 100
$A_{106}$ equals the area sealed by seal 106 and
$A_{112}$ equals the area sealed by seal 112.

In systems where this has been attempted prior to this invention, this relationship is fixed and results in the application of pressure to the trailer brakes in the ratio which is normally 150% of the tractor brake pressure less line pressure drop. This increased pressure is used principally to minimize the inherent delay in trailer brake application due to the 30 to 60 foot run to the trailer brake cylinders from the foot pedal 20 of FIG. 1, and the resultant inherent delay.

Now referring again to FIGS. 8 and 16, the valve 36 of this invention differs from prior art valves and produces a whole new mode of operation due to significant yet simple changes in the piston 100.

The bolt 120 in addition to securing the actuator 116 to piston 100, holds the piston cover 122 and seal 123 in place closing a chamber 124 internal to piston 100. The chamber 124 is closed except for flow restricting orifice 125 communicating with the underside of piston 100 and a second orifice 126 in the side wall of piston 100 in the region between the seals 106 and 112 and particularly the annular space 114.

Orifice 125 allows bleed off of pressure from the underside of piston 100 to chamber 124 and through orifice 126, and then to its volume 114. The volume or annular space 114 is on the upper side of seal 112 and thus the pressure bleed off tends to eliminate the effect of seal 112. The area of lateral space 114 with the area of the bottom of piston 100 equals the area of the upper side of piston 100. Thus, equalization of pressure between the undersides of piston 100 and space 114 produces balanced pressure on piston and synchronized braking, e.g. 1:1 pressure at tractor and trailer brake cylinders.

The time rate of change of pressure between the underside of piston 100 and space 114 is a function of a number of factors including:

(1) the diameter of flow restricting orifice 125;
(2) the volume of cavity 124;
(3) the areas $A_{106}$ and $A_{112}$
(4) the pressure differential P in C/P out; and
(5) the degree of flow restriction of orifice 126, if any.

We have found that in a system with the normal braking pressure between 10 and 80 psi, that the following parameters produce optimum performance.

Area Ratio of Piston:

A top/A bottom≈1.5

Volume of chamber 124: 2.63 ins.
Diameter of Orifice 125: 0.20 in.
Diameter of Orifice 126: 0.62 in.

Successful operation has been achieved keeping the other piston fixed where the orifice 125 varied between 0.01 and 0.03 in. and orifice 126 was at least 0.03 in.

Figure 17:
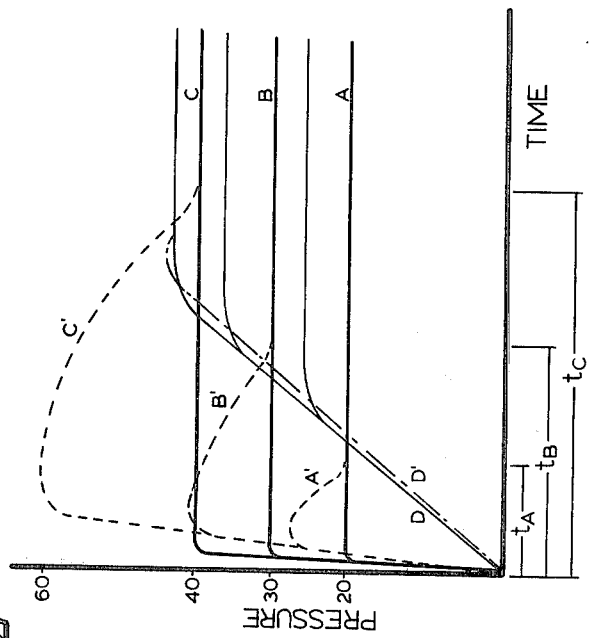
FIG. 17 is a graphical representation of the operational characteristics of the valve of this invention.

Employing the optimum parameters described above, operation is as typified by the illustrative curves of FIG. 17. There the ordinate axis is pressure in pounds per square inch at the ports 54 and 55 of valve 36. The abscissa represents time in seconds. The solid lines A. B. C and D denote the pressure applied to the tractor brake chambers while dashed lines A', B', C' and D' represent brake pressure applied to the trailer brake chambers via the valve of this invention. Curves A,A', B,B', C,C', denote rapid or emergency braking while curves D,D' represent normal slow braking where synchronized braking is desired.

Although the curves of FIG. 17 are idealized and only for purpose of illustration, they are believed to illustrate clearly the operation of this invention.

In each case of emergency or panic braking at three different foot pedal pressures A(20psi), B(30 psi) or C(40 psi) the trailer brake pressure achieved a 150% of application pressure as represented by curves A', B' and C'. Each of these trailer pressure curves however, tapers off to equalize with the tractor pressure as denoted by the negative slope smooth curve portions. This characteristic results from the balancing of excess pressure via orifice 125, chamber 124 and orifice 126, its subsequent exhaust.

Of equal importance is that the time for equalization or synchronization is a function of the service brake pressure applied. Note that $T_c$, the time for curve C' to fall to the level of curve C is greater than $T_B$ and $T_A$. This is exactly as desired. The greater the applied pressure, the longer the system takes to lap off to one synchronized braking.

In the case of normal service braking, the bleed off of excess pressure via the orifice 125, chamber 124 and orifice 126 is almost instantaneous and full synchronization exists with only the normal slight delay being approved in the trailer curve D'.

Thus, significantly improved operation of a braking system has been achieved by a relatively simple but effective valve design.

Braking systems incorporating this improved valve exhibit system performance not achieved before. The remaining elements of the system may be drawn on from existing available products without change. Suitable components are all produced by the assignee of this application, Sealco Air Controls, Inc., of 13530 Nelson Ave., City of Industry, Cal.

| Components of FIG. 1 | |
|---|---|
| Foot valve 16 | Sealco 6125 foot valve |
| Two Way check valve 28 | Sealco 3200 two way check valve |
| Hand valve 21 | Sealco 5900 hand valve |
| Valve 27 | Sealco 17600 dash control |
| Breakaway valve 32 | Sealco 7700 breakaway valve |
| Valve 26 | Sealco 2000D-½ quick release valve |
| Brake chamber 23,24 | Type 30 chamber ¼" port, mfg. by Midland Ross Corp., Cleveland, Ohio. |
| Brake chamber 40-43 | Type 30 chamber ⅜" port, also mfg. by Midland Ross Corp. |

A valve 36 incorporating this invention is Sealco 110200 Ratio Relay emergency valve.

The above described embodiments of this invention are merely descriptive of its principles and are not to be considered limiting. The scope of this invention instead shall be determined from the scope of the following claims, including their equivalents.

What is claimed is:

1. In a brake system for a vehicle system having two sets of brakes, a front set and a rear set of brakes and including a source of fluid pressure, a driver controller valve, said sets of brakes responsive to fluid pressure from said source via said driver controlled valve, said brake system including a secondary valve having at an input port, a connection to said driver controlled valve and its output port coupled to said rear brakes, and in which said secondary valve means produces a substantially instantaneous increase in pressure at the output port above the pressure of said input port, the improvement comprises:
said secondary valve including time delay means for bleeding excess pressure at said outlet port to reduce the pressure at said output port to substantially the pressure at said inlet port after the application of pressure to said inlet port by operation of said driver controlled valve.

2. The combination in accordance with claim 1 wherein said secondary valve means reduces the excess pressure at said outlet port at a time rate which varies as a function of the inlet pressure.

3. The combination in accordance with claim 1 wherein said secondary valve means varies the time rate as a function of the rate of application of pressure by said driver controlled valve.

4. The combination in accordance with claim 1 wherein said secondary valve means reduces the excess pressure at said outlet port at a time varied rate varying inversely with the magnitude of the pressure at the input port of said secondary valve.

5. In a brake system for a vehicle system having two sets of brakes, a front set and a rear set of brakes and including a source of fluid pressure, a driver controlled valve, said sets of brakes responsive to fluid pressure from said source via said driver controlled valve, said brake system including a secondary valve having at an input port, a connection to said driver controlled valve and its output port coupled to said rear brakes, and in which said secondary valve means produces an increase in pressure at the output port above the pressure of said input port, the improvement comprises:

said secondary valve including time delay means for bleeding excess pressure at said outlet port to reduce the pressure at said output port to substantially the pressure at said inlet port after the application of pressure to said inlet port by operation of said driver controlled valve;

wherein said secondary valve means includes a piston having a first side communicating with said inlet port and a second side communicating with said outlet port;

said piston defining an orifice therethrough for transfer excess pressure from said outlet port to a point in said system to substantially equalize the pressure at said inlet port;

said orifice dimensioned to provide restricted flow of fluid from said outlet port side to said inlet port side.

6. The combination in accordance with claim 5 wherein said piston defines a chamber and said orifice communicates between said outlet side of said piston and said chamber.

7. The combination in accordance with claim 6 wherein said piston defines a second orifice communicating between said chamber and opposite the inlet port to substantially equalize the pressure on adjacent and opposite faces of said piston.

8. The combination in accordance with claim 7 wherein said second orifice is positioned to be substantially closed when said piston is in one position and opened responsive to movement of said piston to a second position.

9. The combination in accordance with claim 5 wherein said orifice and chamber are dimensioned to provide a time delay for substantial equalization of pressure between said outlet and inlet sides of said piston to between 1 and 3 seconds.

10. The combination in accordance with claim 5 wherein said piston includes a larger area at the inlet side thereof and a smaller area at the outlet side thereof and said second orifice communicates between said chamber and a larger area face of said piston opposite the inlet side of said piston.

11. The combination in accordance with claim 5 wherein said system is intended to operate at inlet air pressure in the order of up to 120 pounds per square inch and in which the inlet and outlet sides of said piston have area ratios of between 1:1 and 1:1.7, said chamber has a volume of 0.5–1.5 cubic inch and said first orifice has a diameter in the range of 0.01 to 0.03 inches.

12. The combination in accordance with claim 11 wherein said second orifice is of sufficient diameter to provide virtually unrestricted flow from said chamber to the face of said piston.

13. In a brake system for a vehicle system having two sets of brakes, a front set and a rear set of brakes and including a source of fluid pressure, a driver controlled valve, said sets of brakes responsive to fluid pressure from said source via said driver controlled valve, said brake system including a secondary valve having at an input port, a connection to said driver controlled valve and its output part coupled to said rear brakes, and in which said secondary valve means produces an increase in pressure at the output port above the pressure of said input port, the improvement comprises:

said secondary valve including time delay means for returning excess pressure at said outlet port to reduce the pressure at said output port to substantially increase the pressure at said inlet port after the application of pressure to said inlet port by operation of said driver control valve;

wherein said secondary valve means includes a piston having a first side communicating with said inlet port and a second side communicating with said outlet port;

said piston defining an orifice therethrough for transfer excess pressure from said outlet port to a point in said system to substantially equalize the pressure at said inlet port;

said orifice dimensioned to provide restricted flow of fluid from said outlet port side to said inlet port side;

including first seal means for sealing the larger area region at said piston to a corresponding larger area region of said cylinder and second seal means for sealing the smaller area of said piston to a corresponding smaller area region of said cylinder and wherein said first and second orifices bypass said second seal means.

14. The combination in accordance with claim 1 wherein said first set of brakes is located on a truck tractor and said second set of brakes is located on a truck trailer whereby said brake system applies temporary excess braking pressure to the truck trailer upon the application of brake pressure to said first set of brakes.

15. A ratio relay emergency valve comprising:
a valve body including
an input port for the application of actuating pressure;
at least one outlet port;
said body defining a cylinder including a larger area region and smaller area region, said larger area region communicating with said inlet port, said smaller area region communicating with said outlet port;
a piston having a large area region for travel through the large area region of said cylinder and a smaller area region for travel through said smaller area region to said cylinder;
whereby the application of actuating pressure to the said inlet port applies a pressure to said outlet port which is an inverse function of the smaller area to the larger area of said cylinder and piston, the improvement wherein:
the said piston includes a flow restricting orifice communicating between the smaller and larger area portions of said piston whereby upon the application of pressure to the inlet port of said valve provides an initial pressure at the outlet port greater than the pressure at said inlet port followed by substantially equal pressure after a period of time.

16. The combination in accordance with claim 14 wherein said orifice is dimensioned to produce substantial equal pressure after a period of time of one to three seconds.

17. The combination in accordance with claim 16 wherein a chamber is defined by said piston.

18. The combination in accordance with claim 16 including means defining a second orifice communicating between said chamber and the larger area region of said piston.

19. The combination in accordance with claim 18 wherein said valve includes two seal means, the first of said seal means sealing said larger area of said piston to the larger area region of said cylinder;

the second of said seal means sealing said smaller area of said piston to the smaller area region of said cylinder;

and wherein said flow restricting orifice communicates between the smaller area region of said piston and the region between said first and second seal means.

20. The combination in accordance with claim 19 wherein said valve body and piston cooperate to define a cavity between said first and second seal means.

21. The combination in accordance with claim 20 wherein the portion of said piston cooperating with the valve body to define said cavity has an area which, when added to the said smaller area of said piston, substantially equals the larger area of said piston to equalize the pressure on both faces of said piston.

22. The combination in accordance with claim 21 wherein said piston defines said chamber and said piston defines an orifice communicating between said chamber and said cavity.

23. The combination in accordance with claim 22 wherein said valve includes means for substantially closing said second orifice for a portion of the travel of said piston.

24. The combination in accordance with claim 23 wherein said second orifice is in the side wall of said piston; and said means for substantially closing said second orifice comprising the cylinder wall of said valve body.

25. The combination in accordance with claim 22 wherein said means for substantially closing said second orifice so acts when said piston is actuated to a major excursion.

26. The combination in accordance with claim 22 wherein said second orifice is of sufficient size to allow substantially unimpeded reduction of pressure from said chamber when said second orifice is unobstructed.

27. The combination in accordance with claim 22 wherein said valve is operable by fluid pressure of up to 150 psi;

said smaller area to larger area ratio of said piston is in the range of 1:1.1 to 1:1.7, said flow restricting orifice has a diameter of 0.01 to 0.03 in said chamber has a volume of between 0.5 to 3.0 cubic inches and said second orifice has a diameter of between 0.03 and 0.08 inches.

* * * * *